June 16, 1964 J. LUSCHER 3,137,796

SYSTEM HAVING INTEGRATED-CIRCUIT SEMI-CONDUCTOR DEVICE THEREIN

Filed March 31, 1961

3 Sheets-Sheet 1

INVENTOR
JAKOB LUSCHER

BY John B. Hummtrout

ATTORNEY

INVENTOR
JAKOB LUSCHER

BY

ATTORNEY

June 16, 1964 J. LUSCHER 3,137,796

SYSTEM HAVING INTEGRATED-CIRCUIT SEMI-CONDUCTOR DEVICE THEREIN

Filed March 31, 1961 3 Sheets-Sheet 3

INVENTOR
JAKOB LUSCHER

BY John B. Sumntrot

ATTORNEY

United States Patent Office 3,137,796

Patented June 16, 1964

3,137,796

SYSTEM HAVING INTEGRATED-CIRCUIT SEMI-CONDUCTOR DEVICE THEREIN

Jakob Luscher, 7 Route de Drize, Carouge, Geneva, Switzerland

Filed Mar. 31, 1961, Ser. No. 99,879
Claims priority, application Switzerland Apr. 1, 1960
1 Claim. (Cl. 307—88.5)

This invention relates to integrated-circuit semi-conductor devices and systems having at least one such device therein.

It is well known that in the field of electronic devices, particularly semi-conductor devices, the present tendency is towards the obtainment of devices comprising an integrated circuit. By an integrated circuit is meant an electronic circuit in which the active and passive elements thereof are no longer independent elements connected together according to the operation required of the circuit, but are produced in a single unit by processes similar to those used for printed circuits, so as to form integral parts of the said unit, each part fulfilling a certain function in the whole of the resulting circuit. This is therefore a case of giving to a semi-conductor member an integrated structure such that it can fulfil the role of a given electronic circuit.

Among the objects of the present invention is the provision of a system wherein an integrated semi-conductor device is present including a monocrystalline semi-conductor support carrying spaced from each other a plurality of monocrystalline layers of opposite conductivity type to that of the support, each of the layers having spaced ohmic contacts thereon and having junction with the support and supporting at least one corresponding semi-conductive zone of the same conductivity type as the support, each of the zones having junction with the corresponding supporting layer, the system further including first voltage supply means electrically connected with the layers across the ohmic contacts of the layers, polarizing means so polarizing the layers with respect to a potential of the support that potential difference due to thermal equilibrium between the layers on the one hand and the support and zones on the other hand is increased, and second voltage supply means connected with the zones for the potential of the zones to be varied to modulate current of the first voltage supply means through cut-off in the layers.

The accompanying drawings diagrammatically illustrate by way of example one embodiment of the device and a system forming the subject of the invention.

It should be noted that FIGURES 1–5 are on a greatly enlarged scale, the device given by way of example having an extremely small natural size. In actual fact, it has an area of only about 1 square millimetre, the thickness of a crystal 1 and of layers 3 and 4 being respectively of the order of, for example, 1 mm. and a few microns.

Figure 1:
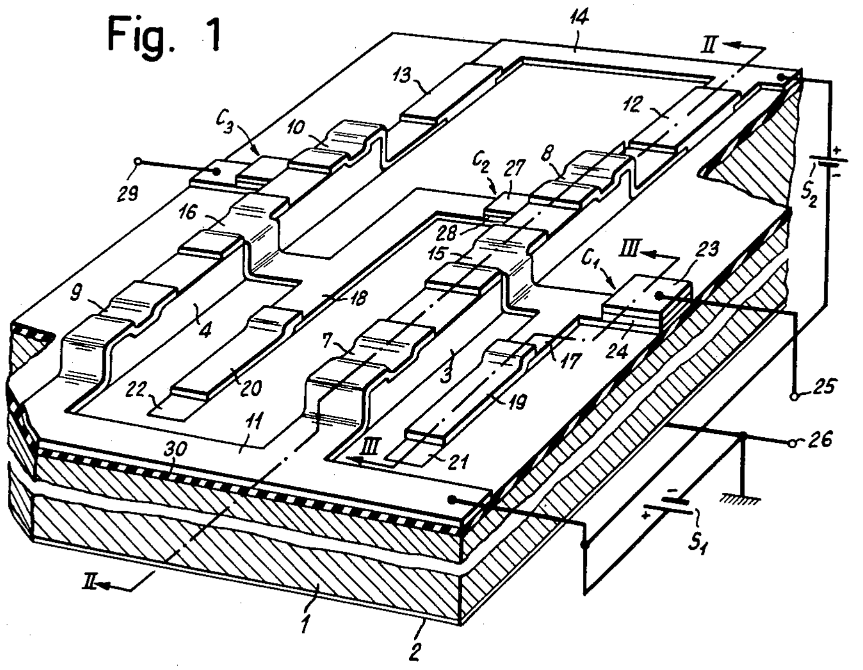
FIGURE 1 is a perspective view thereof.
Figure 2:
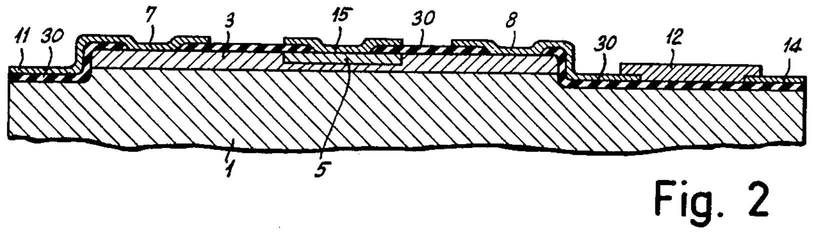
FIGURE 2 is a section on the line II—II in FIGURE 1.
Figure 3:
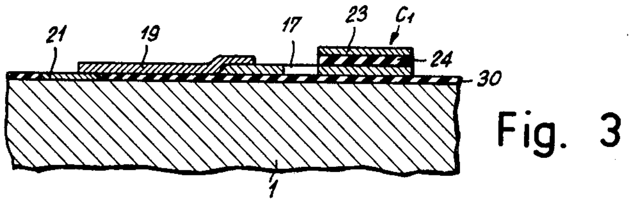
FIGURE 3 is a section on the line III—III in FIGURE 1.

The device shown in FIGURE 1 is formed by a monocrystalline semi-conductor support 1, for example silicon of the "p" conductivity type, one of its surfaces being provided with an ohmic contact 2 connected to the negative pole of a source $S_1$ of direct-current voltage. Part of the thickness of the crystal 1 is removed in order better to show the proportion between various parts of the device. On the opposite surface, the crystal 1 has in relief two monocrystalline layers 3 and 4 of the "n" conductivity type obtained, for example, by the diffusion process. Each of the layers 3 and 4 comprises a zone, 5 and 6 respectively, of the "p" conductivity type (FIGURE 2), also obtained by diffusion. At each of their ends the layers 3 and 4 are provided with an ohmic contact, 7, 8 and 9, 10 respectively, for example of nickel. The contacts 7 and 9 are connected by a lead 11 to the positive pole of the source $S_1$ on the one hand, and to the negative pole of a source $S_2$. The contacts 8 and 10 are each connected by a resistor, 12 and 13 respectively, and a lead 14, to the positive pole of the source $S_2$.

The zones 5 and 6 are each provided with an ohmic contact, 15 and 16 respectively, which, by means of a lead, 17 and 18 respectively, a resistor, 19 and 20 respectively, and a contact, 21 and 22 respectively, connects them to the support 1. The contact 15 of the zone 5 is also connected by means of a capacitor $C_1$ formed by the lead 17 and another lead 23 which are separated by an insulation 24, to one of input terminals 25 of the device, the other terminal 26 being connected to the contact 2. The contact 16 of the zone 6 is connected by a capacitor $C_2$ formed by the lead 18 and another lead 27 separated by an insulation 28, to the contact 8 of the layer 3.

The contact 10 of the layer 4 is connected by a capacitor $C_3$ to one of output terminals 29 of the device, the other terminal 39 thereof being connected to the support 1.

All of the leads connecting the different ohmic contacts are insulated from adjacent semi-conductive parts of the device by insulation 30.

A photolithographic method may be used to produce the device described and illustrated. This method is based on the fact that certain substances may be made insoluble after having been exposed to ultra-violet light. A layer of "n" conductivity type is diffused into one of the faces of a monocrystal 1 of "p" conductivity type. Then, in order to obtain "p" zones 5, 6 at the required regions of the "n" layer, the surface of the latter is first oxidised and the oxidised layer is exposed, after being covered with a photosensitive substance, to light through a photo-negative which masks the regions where it is desired to obtain the "p" zones. In this way the oxidised layer will be capable of dissolution at these regions and permit diffusion. The same photolithographic method is used to separate the two "n" layers 3, 4 which are to form the two active elements. This may be effected by scraping away material of some microns of depth, so that the two "n" layers are in relief on the monocrystalline support "p." After this scraping, the entire surface is again covered with an insulating film, for example silicon oxide deposited by condensation, which is then removed at the regions where it is desired to obtain ohmic contacts, after which a layer, for example of nickel, is deposited, which is then removed, again by the photolithographic method, at the regions where it is not desired. The capacitive couplings at the input of each circuit are obtained in the same way.

The resistors 12, 13, 19 and 20 are obtained in the same way by depositing a layer of carbon for example. These resistors could, of course, be formed by any other suitable material. They could, for example, be formed by semi-conductive layers.

Before explaining the operation of the device described, some explanation of the physical principles used should be given for a better understanding thereof.

Figure 5:
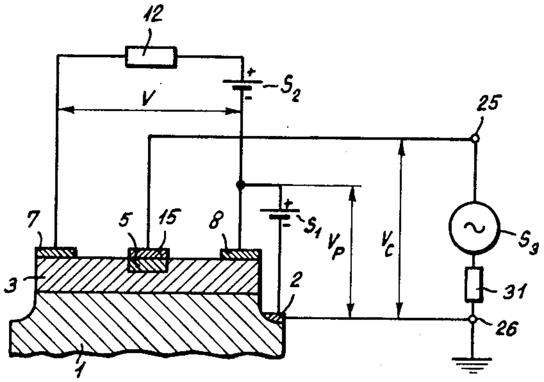
FIGURE 5 is a diagrammatic section of a part of the device constituting an active element.

FIGURE 5 is a diagrammatic section showing part of the device intended to act as an active element in the circuit. It will be seen that this part comprises the support 1, the layer 3, the zone 5, the contacts 2, 7, 8 and 15, the resistor 12, the sources $S_1$ and $S_2$, and the terminals 25, 26 between which a source of alternating-current voltage $S_3$ and the resistor 31 are connected in series.

Figure 6:
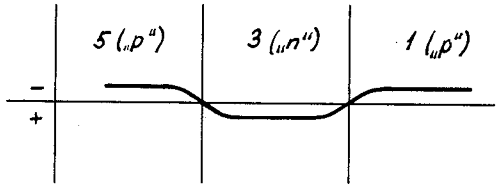
FIGURES 6–10 shows some characteristics of the element shown in FIGURE 5.

When none of three voltages V, $V_p$ and $V_c$ is applied, the distribution of potential in the support 1 ("p"), the layer 3 ("n") and the zone 5 ("p") due to thermal equilibrium takes the form shown in the graph in FIGURE 6.

Figure 7:
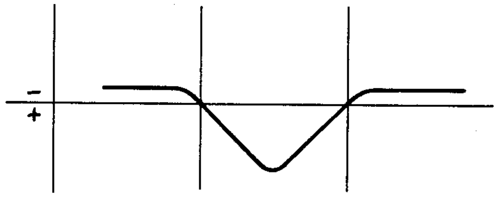

If the layer 3 is polarised positively with respect to the support 1 by the application between the contacts 2 and 8 of the voltage $V_p$, at which voltage the two space charge zones due to two junctions (support-layer and layer-zone) join in the layer 3, the potential distribution in the three parts takes the form shown in the graph in FIGURE 7. In this case, a voltage V cannot produce any current between the contacts 7 and 8 when applied thereto. An increase in the polarisation voltage $V_p$ will result in an increase of the two space charge zones.

Figure 8:
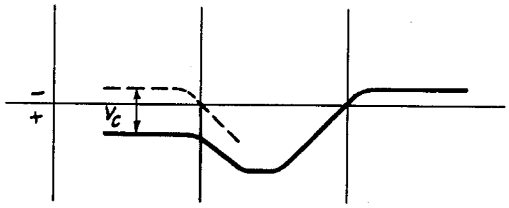
Figure 9:
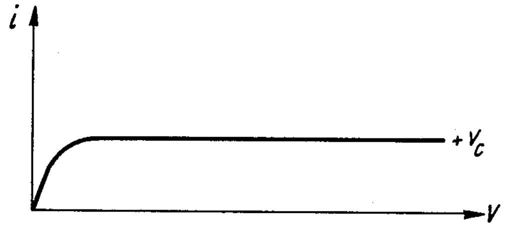

When a voltage $V_c$ which is positive with respect to the contact 2 is applied to the contact 15 and hence to the zone 5, the potential distribution in the three parts takes the form shown in FIGURE 8. In this case, a voltage V will produce a current between the contacts 7 and 8. FIGURE 9 shows the characteristic of the current $i$ in dependence on the voltage V for a given positive value of the voltage $V_c$. When the voltage $V_c$ is less than $V_p$, no injection can take place between the parts 1, 3 and 5.

Figure 10:
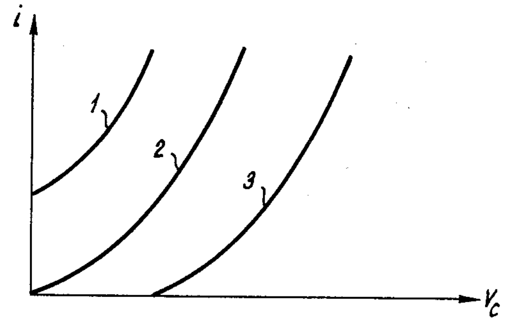

FIGURE 10 shows three characteristics of the current $i$ in dependence on the control voltage $V_c$ for three different values of the polarisation voltage $V_p$ but for one value of the voltage V. The characteristic 1 corresponds to a $V_p$ value at which the two space charge zones do not join, the characteristic 2 corresponds to a $V_p$ value at which the space charge zones join, and the characteristic 3 to a still higher $V_p$ value.

It will therefore be seen that in the first case a current is possible if the voltage $V_c$ is zero and even if it is negative. An alternating voltage $V_c$ will therefore enable the current $i$ to be modulated.

It follows that as a result of the different polarisation possibilities, the active semi-conductor element according to the invention, which is really a field effect transistor, may be used in the same way as a vacuum tube. It should also be noted that the polarisation circuit is independent of the input and output circuits. It will furthermore be seen that all the electrodes of such an element are provided on one of its faces, so that it can easily be included in a semi-conductor member (FIGURE 1).

Figure 4:
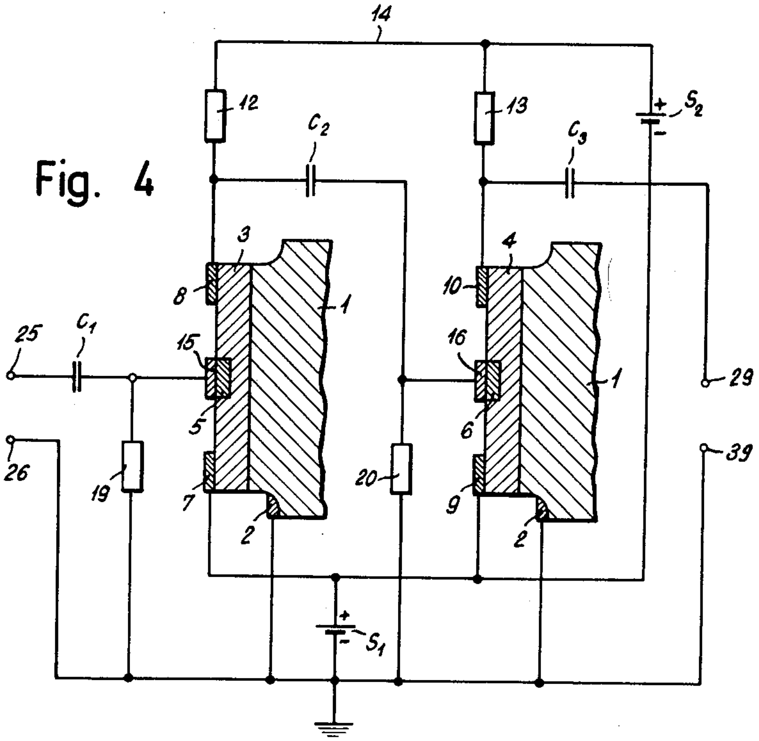
FIGURE 4 shows an electrical system including the device shown in FIGURE 1.

It will readily be seen from the system diagram in FIGURE 4 that the electronic device described and illustrated in FIGURE 1 is a two-stage amplifier, the input of which is formed by the terminals 25 and 26 and the output by the terminals 29 and 39. A signal applied to the input terminals 25, 26 (voltage $V_c$, FIGURE 5) will be amplified by the first active element and transmitted by the capacitor $C_2$ to the second element, in which it is again amplified and transmitted to the output terminals 29, 39 through the capacitor $C_3$.

The integrated-circuit semi-conductor device constituting an amplifier is naturally given only by way of example.

The integrated circuit forming it may be designed so as to act as any electronic circuit. The active and passive elements may be connected so as to form bi-stable circuits which, for example, constitute a demultiplier device.

The invention is not limited to the embodiment of the device as described and illustrated. Thus, for example, the layers 3 and 4 may have a circular form and the zones 5 and 6 an annular form. In this case, the two contacts of a layer must respectively be situated one on the inside and the other on the outside of the ring forming the zone. The layers 3, 4 could comprise more than one zone 5, or 6 respectively, if it is desired to have more than one control electrode for each active element.

It is also obvious that the increase in the potential difference due to thermal equilibrium between each of the layers on the one hand and the crystal member and the corresponding zone on the other hand may be obtained by negatively polarising the support and the zone.

Finally, the integrated circuit semi-conductor device according to the invention may be obtained from a monocrystalline semi-conductor of the "n" type, the layers 3, 4 and the zones 5, 6 being respectively of the "p" and "n" type. The polarity of the voltages must obviously be reversed in this case.

What is claimed is:

An integrated semiconductor and network device including a monocrystalline semiconductor support being of one conductivity type and carrying spaced from each other on one of its faces a plurality of monocrystalline layers of opposite conductivity type to that of said support and each said layer having junction with said support and supporting a semiconductive zone of the same conductivity type as said support, each said zone having junction with the corresponding said supporting layer, and each of said layers together with said corresponding zone being provided with ohmic contacts to form a unipolar field-effect transistor characterized under conditions of thermal equilibrium by having said layer electrically conductive across said ohmic contacts of said layer in said network, and each said transistor further being characterized by having said layer thereof substantially non-conductive electrically across said ohmic contacts of said layer in said network in response to potential difference due to thermal equilibrium between said layer on the one hand and said support and corresponding said zone on the other hand being increased, and said zones and layers and said face of said support being covered with an electrically insulating coating on which are applied passive elements and circuit leads, the latter being connected with said ohmic contacts and said passive elements to form said network.

References Cited in the file of this patent

UNITED STATES PATENTS

| | | |
|---|---|---|
| 2,922,898 | Henisch | Jan. 26, 1960 |
| 2,924,760 | Herlet | Feb. 9, 1960 |
| 3,010,033 | Noyce | Nov. 21, 1961 |
| 3,070,762 | Evans | Dec. 25, 1962 |